Patented Dec. 1, 1925.

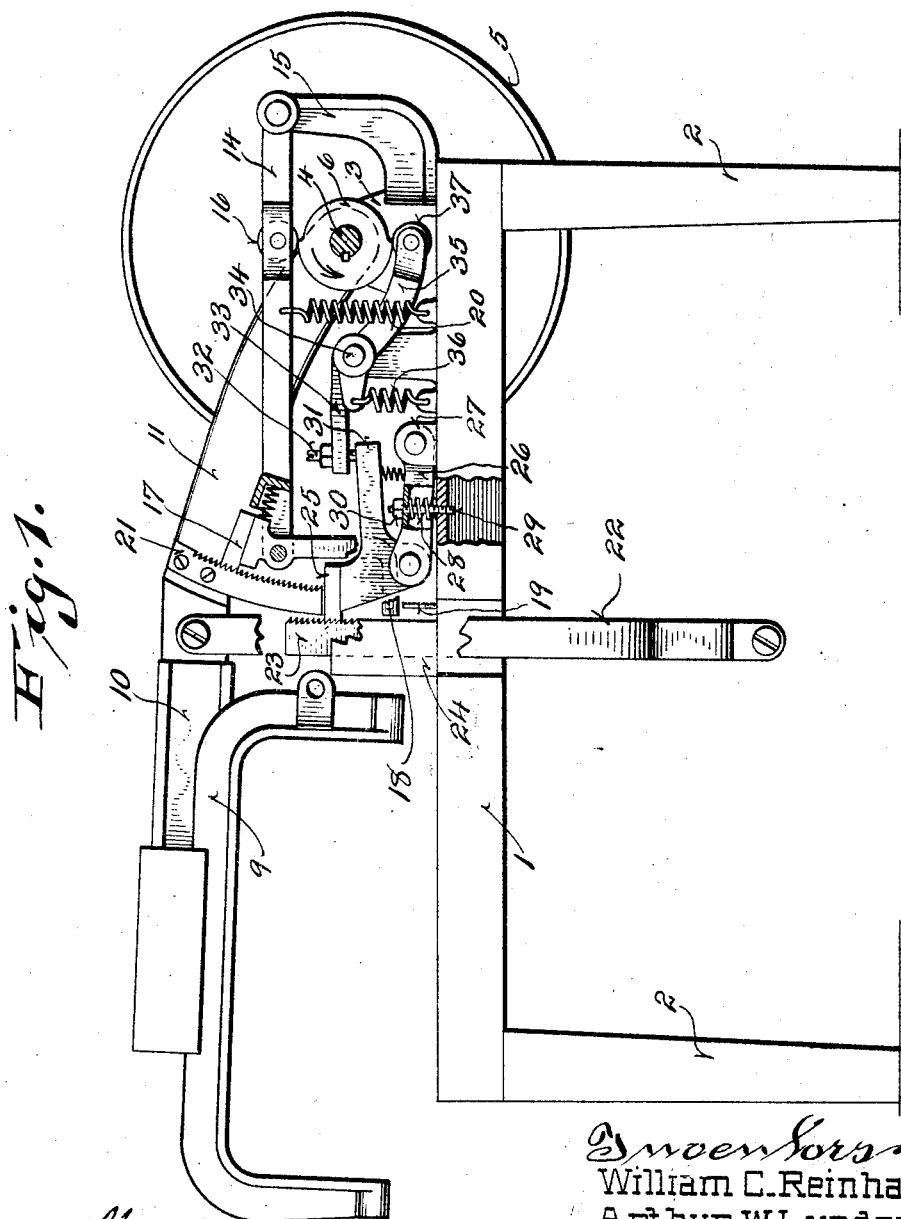

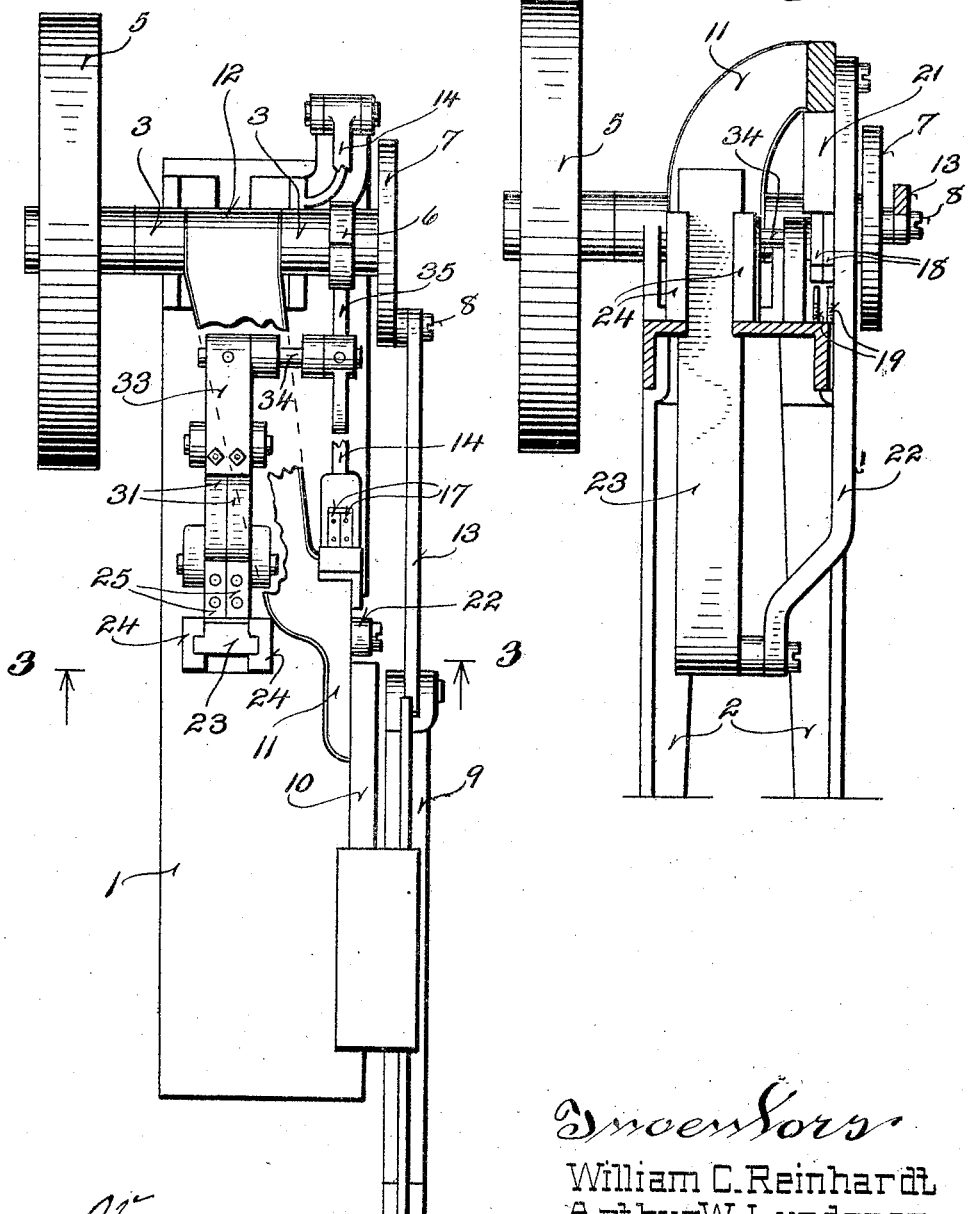

1,563,870

UNITED STATES PATENT OFFICE.

WILLIAM C. REINHARDT AND ARTHUR W. LUNDGREN, OF RACINE, WISCONSIN, ASSIGNORS TO RACINE TOOL & MACHINE COMPANY, OF RACINE, WISCONSIN.

HACK SAW.

Application filed May 3, 1923. Serial No. 636,476.

*To all whom it may concern:*

Be it known that we, WILLIAM C. REINHARDT and ARTHUR W. LUNDGREN, both citizens of the United States, and residents of Racine, in the county of Racine and State of Wisconsin, have invented certain new and useful Improvements in Hack Saws; and we do hereby declare that the following is a full, clear, and exact description thereof.

This invention relates to power driven hack saws.

In power driven hack saws as heretofore constructed, difficulty has been encountered due to the dropping of the saw and frame after the completion of the cutting operation, frequently breaking the saw and occasionally injuring the operator. A further difficulty has been experienced in removing the finished work and positioning new work in the machine. The operator usually has to hold or jack up the saw, to maintain it in elevated position while the old work is being removed and the new work inserted. This greatly handicaps him as it leaves but one hand free to change the work.

This invention is designed to overcome the above noted defects and has, therefore, for its objects the provision of a power driven hack saw so organized that the saw and frame will not drop after completion of the work, which will maintain the saw in any elevated position in which the operator may place it, and in which the saw is at all times automatically controlled.

Further objects are to provide a gravity fed hack saw in which the saw is automatically lifted during its idle stroke, in which a step by step lowering of the saw is permitted, in which an excessive drop of the saw at any stage of the cutting operation is prevented, in which the saw is cushioned if it attempts a sudden downward movement, and in which a high rate of speed is attained.

An embodiment of the invention is shown in the accompanying drawings, in which:—

Figure 1 is a side elevation, with parts broken away, of the device.

Figure 2 is a plan view with parts broken away.

Figure 3 is a vertical sectional view taken on the line 3—3 of Figure 2.

Referring more particularly to the drawings, it will be seen that the power driven hack saw comprises a bed plate 1, supported by a plurality of legs 2 and carrying a pair of upwardly projecting lugs 3. A transverse shaft 4 is revolubly mounted in the lugs 3 and carries, at its outer end, a driven pulley 5. This shaft is provided with a cam 6 approximately one-half of whose periphery is raised and one-half of which is lowered, as may be seen from Figure 1. It also carries a crank which may comprise a crank plate 7 provided with a crank pin 8. A hack saw frame 9 is slidably carried by a guide 10, which may consist of a frame having an arm 11 extending at a slight angle to the plane of the guide faces and terminating in a bearing 12 journalled upon the shaft 4, as may be seen from Figures 1 and 2, so that the entire guide is pivotally mounted axially of the shaft and may be swung about such shaft into any desired position. A pitman 13 connects the crank pin 8 with the hack saw frame 9.

In hack saws it is desirable that the saw be lifted upon the idle or return stroke. This is readily accomplished by pivotally mounting a lever 14 upon a bracket 15, and providing it with a roller 16 at a point intermediate its ends, such roller being positioned so as to cooperate with the cam 6, as may be seen from Figure 1. The free end of the lever is extended and carries a spring pressed pawl 17, which is pivotally secured to the outer end of the lever and provided with an angularly arranged bell crank end 18. This end 18 is adapted to contact with a trip, or pin, 19 which may, if desired, be made adjustable. A spring 20 is connected to the lever 14 and to the bed plate, and is designed to hold the lever downwardly, causing the roller 16 to firmly contact with the cam 6. An arcuate ratchet member 21 is rigidly secured to the arm 11 of the guide and is adapted to cooperate with the pawl 17.

It will be seen, from the mechanism thus far described, that as the shaft 4 rotates in the direction of the arrow, (see Figure 1) the saw frame 9 will be reciprocated and during alternate half revolutions the lever 14 will be raised, thereby lifting the saw from the work. When the lever 14 is lowered, the trip operates to release the pawl 17 and allow the saw to contact with the work upon its cutting stroke.

It has been found, however, that with this type of mechanism, difficulty is experienced when the saw suddenly passes through either a soft portion of the work or completely thru the work. The saw then falls downwardly, frequently breaking it and occasionally injuring the operator. In addition to this, the saw may not be lifted upwardly from the work and automatically retained in its elevated position.

To overcome these defects, mechanism has been provided for limiting the downward motion of the saw and for cooperating with the pawl and ratchet mechanism previously described to maintain the saw in any desired elevated position after it has been manually raised thereto. This mechanism comprises a link 22 pivotally mounted at one end upon the arm 11 of the guide, and at its other end pivotally joined to a ratchet member 23, which is vertically slidable in guides 24 and passes through an aperture in the bed plate. This ratchet member 23 cooperates with a pawl 25 which is pivotally carried by a lever 26, such lever being, in turn, pivotally supported by lugs 27 extending upwardly from the bed plate. This lever 26 is provided at a point intermediate its end with a helical spring 28 adapted to cushion the lever. This spring may be positioned loosely around a threaded pin 29 equipped at its upper end with an adjusting nut 30 to limit the upward motion of the lever 26. The pawl 25 is provided with a bell crank lever 31, integrally formed therewith, and adapted to be operated by means of an adjustably mounted tappet pin 32 carried by a lever 33. This lever 33 is mounted rigidly upon a transverse shaft 34 journalled in suitable lugs carried by the bed plate. A second lever 35 is rigidly secured upon the shaft and is provided at one end with an extension to which is secured a spring 36, the other end of such spring being secured to the bed plate. The free end of the lever 35 carries a roller 37 adapted to co-operate with the cam 6, as may be seen from Figure 1.

The mechanism just described is adapted to operate when the previously described pawl and ratchet mechanism is inoperative so that the guide and saw frame is automatically controlled at every instant throughout a cycle of operations.

The operation of the apparatus is as follows:—When the shaft 4 is rotated, reciprocatory motion is imparted to the saw frame. Upon the idle stroke, the pawl 17 co-operates with the ratchet 21, and by means of the lever 14 and cam, elevates the saw frame during its idle stroke. At the initiation of the working stroke, the lever 14 is lowered and the pawl 17 tripped. However, just before this occurs, the pawl 25 engages the ratchet 23 and limits the downward motion of the saw, such pawl operatively connecting the saw frame with the lever 26, so that, in effect, a floating support is afforded. The yield of the spring 28 is such that the saw is permitted to sink a greater distance than its ordinary maximum depth of cut, so that in no wise is the cutting action interfered with. At the completion of the cutting stroke, the pawl 25 is tripped by the striking of the screw 32 against the arm 31 while the pawl 17 engages the ratchet 21 and operates in the manner previously described. It is to be noted that the screw 31 is controlled by means of the cam 6 and the cam follower 37, and when the cam permits the cam follower to move inwardly towards the shaft 4, the screw 32 is depressed and thus releases the pawl 25.

It is to be particularly noted that the downward motion of the saw frame is limited so that even when the work is cut thru, the saw does not drop and damage the apparatus or injure the operator, but is at all times automatically controlled.

It is further to be noted that the ratchet teeth extend in the same direction, and permit the saw and guide to be raised to any desired height and to be automatically held at this point while the work is changed. In other words, the ratchet members 21 and 23 are moved upwardly whenever the saw frame is manually rocked upwardly. In view of the fact that the teeth in the two ratchet members extend downwardly, it is clear that such ratchet members will freely slide upwardly past their respective pawls, as indicated at 17 and 25, respectively. This is a very desirable feature, as it leaves both hands of the operator free to change and manipulate the work.

Although one form of the invention has been described in considerable detail, it is to be understood that the invention may be embodied in several different forms and therefore is to be limited only as set forth in the appended claims.

It is to be noted that the spring 28 constantly urges the lever 26 and the associated mechanism upwardly, so that when the pawl 25 is released it automatically moves upwardly into a position to take a fresh hold of the ratchet bar 23 at a successively higher point. The point at which the pawl 25 will engage the ratchet bar is determined by the adjustment of the nut 30.

When cutting soft materials it is frequently desirable to limit the depth or extent of the cut. This is readily accomplished by adjusting the nut 30. For instance, in extremely soft metals it may be undesirable to allow the saw to sink the full extent to which it is capable, on each working stroke. This may be readily prevented by limiting the extent of movement of the lever 26 and consequently, of the pawl 25 by adjusting the nut 30.

Claims:

1. A power driven hack saw comprising a saw frame, means for reciprocating said frame, a pivotally mounted guide for said frame, means for lifting said frame upon the idle stroke, means for releasing said lifting means at the beginning of the working stroke, and other means including a pawl and ratchet for operatively supporting said frame when said lifting means is released to limit the downward motion of said frame during each working stroke.

2. A power driven hack saw comprising a saw frame, means for reciprocating said frame, a pivotally mounted guide for said frame, means for lifting said frame upon the idle stroke including pawl and ratchet mechanism, a trip for said pawl, and a second pawl and ratchet means for supporting said frame when said tripping mechanism functions whereby the downward motion of said frame is limited, and whereby said frame may be directly raised upwardly and held in any desired position.

3. A power driven hack saw comprising a saw frame, a pivotally mounted guide for said frame, means for reciprocating said frame, mechanism for intermittently lifting said saw upon its idle stroke, pawl and ratchet mechanism for supporting said frame when it is not lifted by said lifting means, and automatic means for tripping said pawl and ratchet mechanism.

4. A power driven hack saw comprising a saw frame, a pivotally mounted guide for said frame, a rotary shaft, a crank mounted upon said shaft and operatively coupled to said saw frame, a cam mounted upon said shaft, ratchet mechanism secured to said guide, a lever operated by said cam, a pawl carried by said lever and cooperating with said ratchet, to intermittently lift said frame upon its idle stroke, a trip for said pawl, a second ratchet secured to said guide, a pawl for engaging said ratchet when said first mentioned pawl is tripped, and means operated from said cam for tripping said last mentioned pawl.

In testimony that we claim the foregoing we have hereunto set our hands at Racine, in the county of Racine and State of Wisconsin.

WILLIAM C. REINHARDT.
ARTHUR W. LUNDGREN.